United States Patent
Jin et al.

(10) Patent No.: US 11,313,431 B1
(45) Date of Patent: Apr. 26, 2022

(54) QUASI-ZERO STIFFNESS ELECTROMAGNETIC VIBRATION ISOLATOR SUITABLE FOR ULTRA-LOW FREQUENCY VIBRATION REDUCTION AND ISOLATION

(71) Applicant: Harbin Engineering University, Harbin (CN)

(72) Inventors: Guoyong Jin, Harbin (CN); Junjie Yuan, Harbin (CN); Tiangui Ye, Harbin (CN); Zhigang Liu, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 17/497,100

(22) Filed: Oct. 8, 2021

(30) Foreign Application Priority Data

Dec. 28, 2020 (CN) .......................... 202011589268.5

(51) Int. Cl.
  *F16F 13/00* (2006.01)
  *H02K 5/24* (2006.01)
  *F16F 15/03* (2006.01)
  *H02K 1/18* (2006.01)

(52) U.S. Cl.
  CPC .............. *F16F 13/00* (2013.01); *F16F 15/03* (2013.01); *H02K 1/185* (2013.01); *H02K 5/24* (2013.01)

(58) Field of Classification Search
  CPC ...................................................... F16F 13/00
  See application file for complete search history.

(56) References Cited

U.S. PATENT DOCUMENTS

| | | | | | |
|---|---|---|---|---|---|
| 5,736,798 | A | * | 4/1998 | O'Brien | B24B 13/00 310/103 |
| 2017/0328441 | A1 | * | 11/2017 | Kanaya | F16F 13/26 |

FOREIGN PATENT DOCUMENTS

| | | | | | |
|---|---|---|---|---|---|
| CN | 106402262 | A | * | 2/2017 | |
| CN | 108980263 | A | * | 12/2018 | |
| CN | 111828524 | A |   | 10/2020 | |
| DE | 102017204844 | A1 | * | 9/2018 | H02K 35/02 |
| WO | WO-2019201907 | A1 | * | 10/2019 | F16F 6/00 |

* cited by examiner

*Primary Examiner* — Melody M Burch
(74) *Attorney, Agent, or Firm* — WPAT, PC (57) ABSTRACT

A quasi-zero stiffness electromagnetic vibration isolator for ultra-low frequency vibration reduction and isolation is provided. When the vibration isolator is in a static equilibrium position, upper and lower air gaps are equal, and electromagnetic attraction forces of upper and lower stator assemblies to a mover assembly are equal. When the load tends to move upwards, the mover assembly is subjected to an upward resultant force, when the load tends to move downwards, the mover assembly is subjected to a downward resultant force, showing the characteristic of negative stiffness. A negative stiffness mechanism composed of the upper stator assembly, the lower stator assembly and the mover assembly is connected in parallel with the positive stiffness springs to achieve a quasi-zero stiffness.

6 Claims, 5 Drawing Sheets

QUASI-ZERO STIFFNESS ELECTROMAGNETIC VIBRATION ISOLATOR SUITABLE FOR ULTRA-LOW FREQUENCY VIBRATION REDUCTION AND ISOLATION

TECHNICAL FIELD

The invention relates to the field of vibration controls, and more particularly to a quasi-zero stiffness electromagnetic vibration isolator suitable for ultra-low frequency vibration reduction and isolation.

DESCRIPTION OF RELATED ART

As an important technology for vibration control, vibration isolation technology aims to take certain measures between a vibration source and a system, and install an appropriate vibration damper or vibration isolation equipment to isolate a direct transmission of vibration. In theory, a traditional passive vibration isolator can only attenuate a vibration whose excitation frequency is greater than V times of a natural frequency of the system. As the demand for vibration isolation continues to increase, there is an urgent need for a vibration isolation technology that can maintain high static support capacity and has low dynamic stiffness in a low-frequency environment. Therefore, a quasi-zero stiffness vibration isolation technology has received more and more attention in recent years.

Quasi-zero stiffness vibration isolators are mostly composed of positive and negative stiffness mechanisms in parallel. Positive stiffness elements (such as springs, etc.) provide the static support capacity, and a negative stiffness provided by the negative stiffness mechanism counteracts a positive stiffness to thereby achieve a quasi-zero stiffness. When a vibration isolation system is displaced from a static equilibrium position, positive stiffness springs suppress the movement trend, the negative stiffness mechanism strengthens the movement trend in the displacement movement direction, and a parallel connection of the two can reduce an overall stiffness of the system to be close to or equal to zero, and meanwhile achieve a high static stiffness and a low dynamic stiffness, thereby greatly broadening a vibration isolation frequency band and can be well used to solve the problem of low-frequency vibration isolation.

The realization of negative stiffness is the focus of quasi-zero stiffness technology, which directly determines an overall performance of the vibration isolation system. Among many types of mechanisms for realizing negative stiffness, since a control method of an electromagnetic mechanism is more flexible, a control strategy can be formulated by designing a relevant controller and a control current can be adjusted timely according to an external excitation frequency to further improve the vibration isolation performance of the mechanism, and good accuracy and rapidity can be achieved, so that an electromagnet-type negative stiffness mechanism has gradually become the focus of research.

In the field of low-frequency vibration isolation requiring relatively large load-bearing capacity, such as processing and manufacturing of ships and large-scale ultra-precision equipment, a positive stiffness mechanism is required to provide relatively large static support capacity and a negative stiffness mechanism corresponding thereto is required to provide relatively large electromagnetic negative stiffness. A disk-type electromagnet mechanism has characteristics of large electromagnetic force, fast pull-in and less magnetic leakage, and therefore a structure of longitudinally symmetrical arrangement is adopted to design a negative stiffness mechanism, but it would cause problems as follows. In one aspect, in order to ensure a sufficient static support capacity of a vibration isolator, it is necessary to ensure that positive stiffness springs have enough compression space; and in another aspect, in order to ensure a low dynamic stiffness of the vibration isolator, the negative stiffness mechanism is required to have high negative stiffness, so an air gap of the electromagnet-type negative stiffness mechanism should not be excessively large. However, the above two requirements contradict each other when the positive and negative stiffness mechanisms are connected in parallel.

SUMMARY

In consideration of overall processing difficulty and engineering applicability of structure, the invention provides technical solutions as follows.

In an embodiment, an electromagnetic vibration isolator of quasi-zero stiffness suitable for ultra-low frequency vibration reduction and isolation is provided. The electromagnetic vibration isolator includes: a stator mounting plate, a vibration isolator casing, a mover assembly, an upper stator assembly, a spring, a lower stator assembly, and a base. The lower stator assembly is mounted on the base, the vibration isolator casing is mounted on the base, the stator mounting plate is mounted on the vibration isolator casing, the upper stator assembly is mounted on the stator mounting plate, the spring is mounted between the mover assembly and the vibration isolator casing, and the mover assembly is placed on the spring. The stator mounting plate, the vibration isolator casing and the base each are made of a magnetically non-conductive material.

In a preferred embodiment, the mover assembly includes a load plate, an adjustment nut, an intermediate plate, magnetic isolation ring fixing pins, an intermediate plate fixing pin, load plate fixing screws, support sleeves, armature fixing screws, a main shaft, an upper armature, a magnetic isolation ring, and a lower armature. The upper armature and the lower armature each are made of a high magnetically conductive material, and the magnetic isolation ring is made of a magnetically non-conductive material. An inner side of the magnetic isolation ring and the main shaft each are disposed with two pin holes at corresponding positions, and the magnetic isolation ring fixing pins fix the magnetic isolation ring and the main shaft together; the upper armature and the lower armature are symmetrically mounted in upper and lower sides of the magnetic isolation ring respectively, and the armature fixing screws fix the upper armature and the lower armature with the magnetic isolation ring together; corresponding positions of the intermediate plate and the main shaft respectively are disposed with pin holes, and the intermediate plate fixing pin fixes the intermediate plate and the main shaft together. Part of the main shaft above the intermediate plate is threaded to fit with the adjustment nut, the adjustment nut is mounted on the main shaft, the intermediate plate is disposed with threaded holes, and the load plate is disposed with unthreaded holes, the load plate is mounted above the intermediate plate through the support sleeves and the load plate fixing screws, and the support sleeves are located between the intermediate plate and the load plate.

In a preferred embodiment, the upper stator assembly includes: an upper inner iron core, an upper coil, an upper outer iron core, an upper oil-free shaft sleeve, upper shaft sleeve fixing screws, and upper iron core fixing screws. The upper coil is wound around the upper inner iron core, the upper oil-free shaft sleeve is mounted to an inner side of the upper inner iron core through the upper shaft sleeve fixing screws, and the upper outer iron core is mounted to an outer side of the upper inner iron core; the upper inner iron core and the stator mounting plate are disposed with unthreaded holes, the upper outer iron core is correspondingly disposed with threaded holes, and the upper iron core fixing screws fix the upper inner iron core and the upper outer iron core to the stator mounting plate. The upper inner iron core and the upper outer iron core each are made of a high magnetically conductive material.

In a preferred embodiment, the lower stator assembly includes: a lower inner iron core, a lower coil, a lower outer iron core, a lower oil-free shaft sleeve, lower shaft sleeve fixing screws, and lower iron core fixing screws. The lower inner iron core and the lower outer iron core each are made of a high magnetically conductive material. The lower coil is wound around the lower inner iron core, the lower oil-free shaft sleeve is mounted to an inner side of the lower inner iron core through the lower shaft sleeve fixing screws, and the lower outer iron core is mounted to an outer side of the lower inner iron core; the lower inner iron core and the base are disposed with unthreaded holes, and the lower outer iron core is disposed with threaded holes at corresponding positions, and the lower iron core fixing screws fix the lower inner iron core and the lower outer iron core to the base.

In a preferred embodiment, the electromagnetic vibration isolator further includes casing fixing screws, the base is disposed with unthreaded holes, the vibration isolator casing is disposed with threaded holes at corresponding positions, and the vibration isolator is mounted to the base through the casing fixing screws.

In a preferred embodiment, the vibration isolator casing is disposed with stepped grooves, the stator mounting plate is mounted on the stepped grooves of the vibration isolator casing, the stator mounting plate and the vibration isolator casing are disposed with pin holes at corresponding positions, the stator mounting plate is disposed with unthreaded holes, and the vibration isolator casing is disposed with threaded holes at corresponding positions, the stator mounting plate is mounted to the vibration isolator casing through stator mounting plate positioning pins and fixed through stator mounting plate fixing screws.

In a preferred embodiment, the vibration isolator casing is provided with an observation hole, and the observation hole is configured (i.e., structured and arranged) to be cooperative with an adjustment nut of adjusting centricity of the mover assembly in a case of the vibration isolator is in a static equilibrium position and thereby ensuring air gaps between the upper stator assembly as well as the lower stator assembly and the mover assembly to be consistent.

Sum up, the invention can achieve the following beneficial effects that:

In one aspect, the embodiments of the invention adopt a disk-type symmetrical structure and a large electromagnetic attraction force can be obtained, so that it can be applied to many occasions with high load-bearing capacity requirements. Moreover, owing to the design of stepped grooves for the vibration isolator casing, the position of the stator mounting plate is adjustable, thereby achieving the adjustable position of the upper stator assembly, and satisfying requirements of relatively large spring compression space when bearing a static load and of relatively small air gap when bearing a dynamic load, and consequently it can provide relatively large static support capacity while realizing relatively large negative stiffness.

In another aspect, the vibration isolator of the invention has a moderate volume and may have rapid overall response during operation, simple control mode, convenient fine adjustment of centricity in the static equilibrium position, simple realization mode, and relatively low processing difficulty.

In addition, the invention has a wide range of applications, such as vibration reduction in the processing and manufacturing of ships and large ultra-precision equipment, improvements of man-machine efficiency, etc. Its installation method is simple and flexible, and it can be combined with various types of passive shock absorbers, and can also be arranged arbitrarily on controlled objects or pedestals.

DETAILED DESCRIPTION OF EMBODIMENTS

The invention will be described below in detail with reference to specific embodiments.

Referring to FIG. 1 through FIG. 15, a quasi-zero stiffness electromagnetic vibration isolator (also referred to as electromagnetic vibration isolator of quasi-zero stiffness) suitable for ultra-low frequency vibration reduction and isolation is provided. Specifically, the quasi-zero stiffness electromagnetic vibration isolator suitable for ultra-low frequency vibration reduction and isolation may include: a housing composed of a stator mounting plate 1, a vibration isolator casing 2 and a base 3; and a mover assembly, an upper stator assembly and a lower stator assembly, etc. arranged inside the housing. The lower stator assembly is mounted on the base 3, the vibration isolator casing 2 is mounted on the base 3, the stator mounting plate 1 is mounted on the vibration isolator casing 2, the upper stator assembly is mounted on the stator mounting plate 1, springs 4 are mounted between the mover assembly and the vibration isolator casing 2, the mover assembly as a whole is arranged on the springs 4. The stator mounting plate 1, the vibration isolator casing 2 and the base 3 each are made of a magnetically non-conductive material.

The mover assembly may include: a load plate 5, an adjustment nut 6, an intermediate plate 7, a main shaft 8, an upper armature 9, a magnetic isolation ring 10, a lower armature 11 and so on. An inner side of the magnetic isolation ring 10 are disposed with two pin holes and corresponding positions of the main shaft 8 are also disposed with two pin holes, so that the magnetic isolation ring 10 and the main shaft 8 are fixed together by magnetic isolation ring fixing pins 12. The upper armature 9 and the lower armature 11 are symmetrically mounted in upper and lower sides of the magnetic isolation ring 10, respectively. The upper armature 9 and the lower armature 11 are individually fixed into the magnetic isolation ring 10 by armature fixing screws 13. The intermediate plate 7 and a corresponding position of the main shaft 8 each are disposed with one pin hole, so that the intermediate plate 7 and the main shaft 8 are fixed together by an intermediate plate fixing pin 14. Part of the main shaft 8 above the intermediate plate 7 is threaded to fit with the adjustment nut 6, the adjustment nut 6 is mounted on the main shaft 8. The intermediate plate 7 is disposed with unthreaded holes, and corresponding positions of the load plate 5 are disposed with threaded holes. The load plate 5 is mounted above the intermediate plate 7 by support sleeves 15 and load plate fixing screws 16, and the support sleeves 15 are located between the intermediate plate 7 and the load plate 5. The upper armature 9 and the lower armature 11 each are made of a high magnetic conductive material, and the magnetic isolation ring 10 is made of a magnetically non-conductive material.

The upper stator assembly may include: an upper inner iron core 17 wound with an upper coil 18, an upper outer iron core 19, and an upper oil-free shaft sleeve 20. The upper oil-free shaft sleeve 20 is mounted onto an inner side of the upper inner iron core 17 by upper shaft sleeve fixing screws 21. The upper outer iron core 19 is mounted onto an outer side of the upper inner iron core 17. The upper inner iron core 17 and the stator mounting plate 1 are disposed with unthreaded holes, and the upper outer iron core 19 is disposed with threaded holes at corresponding positions, and thereby the upper inner iron core 17 and the upper outer iron core 19 are fixed onto the stator mounting plate 1 by upper iron core fixing screws 22. The upper inner iron core 17 and the upper outer iron core 19 each are made of a high magnetically conductive material.

The lower stator assembly may include: a lower inner iron core 23 wound with a lower coil 24, a lower outer iron core 25, and a lower oil-free shaft sleeve 26. The lower oil-free shaft sleeve 26 is mounted onto an inner side of the lower inner iron core 23 by lower shaft sleeve fixing screws 27. The lower outer iron core 25 is mounted onto an outer side of the lower inner iron core 23. The lower inner iron core 23 and the base 3 are disposed with unthreaded holes, and the lower outer iron core 25 is disposed with threaded holes at corresponding positions, and thereby the lower inner iron core 23 and the lower outer iron core 25 are fixed onto the base 3 by lower iron core fixing screws 28. The lower inner iron core 23 and the lower outer iron core 25 each are made of a high magnetically conductive material.

The base 3 is disposed with unthreaded holes, and the vibration isolator casing 2 is disposed with threaded holes at corresponding positions, and thereby the vibration isolator casing 2 is mounted onto the base 3 by casing fixing screws 29.

Corresponding positions of the intermediate plate 7 and the vibration isolator casing 2 may be disposed with spring positioning holes, the springs 4 are mounted between the intermediate plate 7 and the vibration isolator casing 2, and the mover assembly as a whole is placed on the springs 4.

The vibration isolator casing 2 may be disposed with stepped grooves, the stator mounting plate 1 is mounted on the stepped grooves of the vibration isolator casing 2. Corresponding positions of the stator mounting plate 1 and the vibration isolator casing 2 are disposed with pin holes, the stator mounting plate is disposed with unthreaded holes, and the vibration isolator casing is disposed with threaded holes at the corresponding positions, the stator mounting plate 1 is mounted onto the vibration isolator casing 2 by stator mounting plate fixing pins 31, and the stator mounting plate 1 and the vibration isolator casing 2 are fixed and tightened by stator mounting plate fixing screws 30.

The vibration isolator casing 2 may be provided with an observation hole (also referred to as observation window), which is cooperative with the adjustment nut 6 of adjusting a centricity of the mover assembly when the vibration isolator is in a static equilibrium position, so as to ensure air gaps between the upper stator assembly as well as the lower stator assembly and the mover assembly to be consistent.

Specific working process and principle of the vibration isolator may be as follows.

Figure 1:
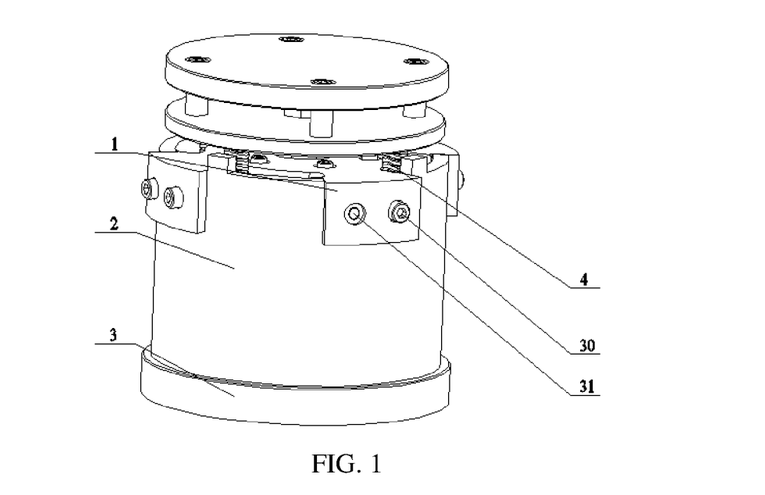
FIG. 1 is a schematic structural view of a quasi-zero stiffness electromagnetic vibration isolator suitable for an ultra-low frequency vibration reduction and isolation.
Figure 2:
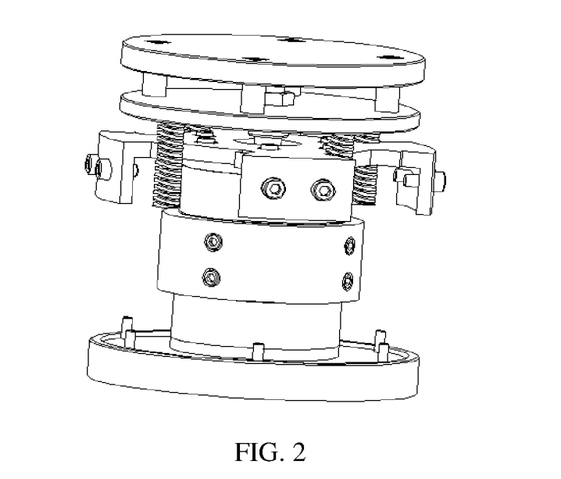
FIG. 2 is a schematic view of an internal structure of the quasi-zero stiffness electromagnetic vibration isolator suitable for an ultra-low frequency vibration reduction and isolation.
Figure 3:
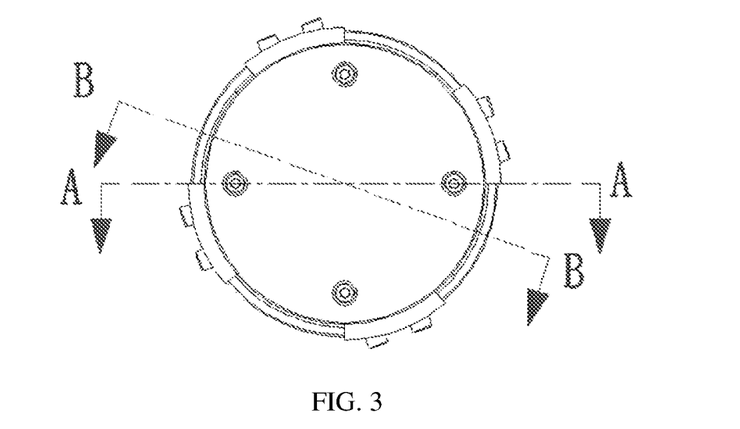
FIG. 3 is a schematic top view of the quasi-zero stiffness electromagnetic vibration isolator suitable for an ultra-low frequency vibration reduction and isolation.
Figure 4:
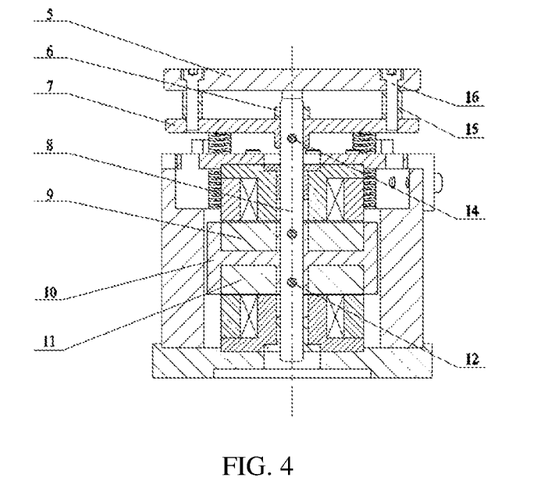
FIG. 4 is a schematic cross-sectional view of the quasi-zero stiffness electromagnetic vibration isolator suitable for an ultra-low frequency vibration reduction and isolation taken along the line A-A.
Figure 5:
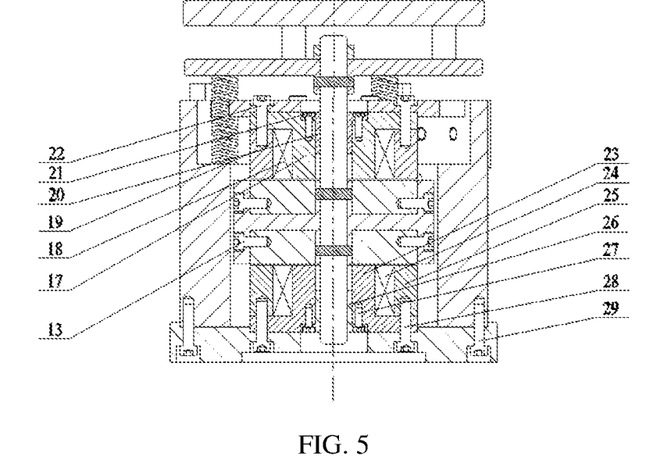
FIG. 5 is a schematic cross-sectional view of the quasi-zero stiffness electromagnetic vibration isolator suitable for an ultra-low frequency vibration reduction and isolation taken along the line B-B.
Figure 6:
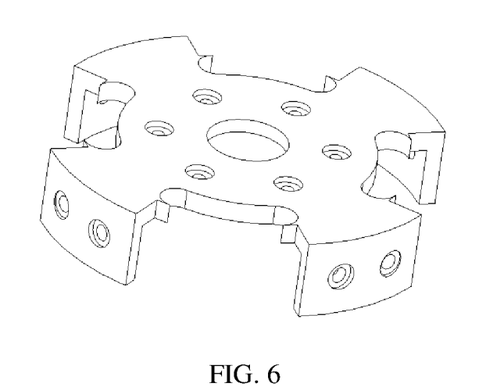
FIG. 6 is a schematic perspective view of a stator mounting plate.
Figure 7:
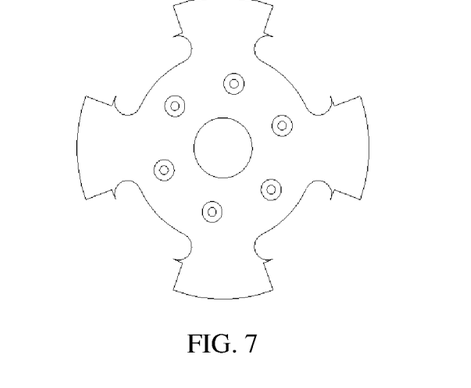
FIG. 7 is a schematic top view of the stator mounting plate.
Figure 8:
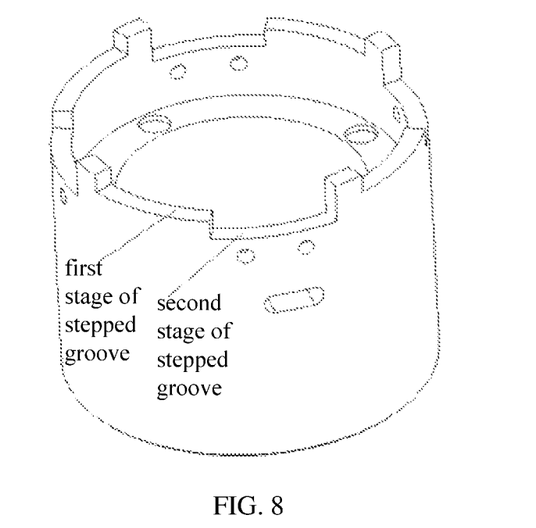
FIG. 8 is a schematic perspective view of a vibration isolator casing.
Figure 9:
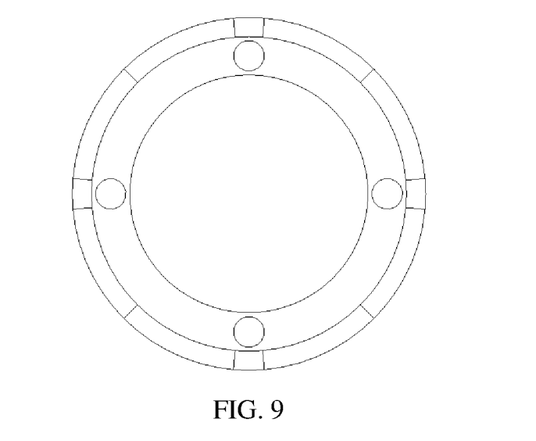
FIG. 9 is a schematic top view of the vibration isolator casing.
Figure 10:
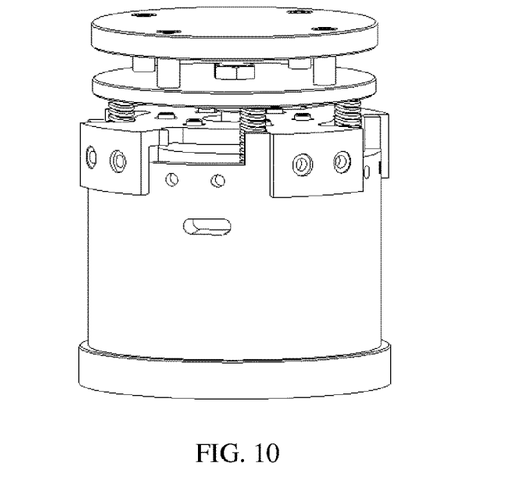
FIG. 10 is a schematic view of the vibration isolator in a state of being not loaded.
Figure 11:
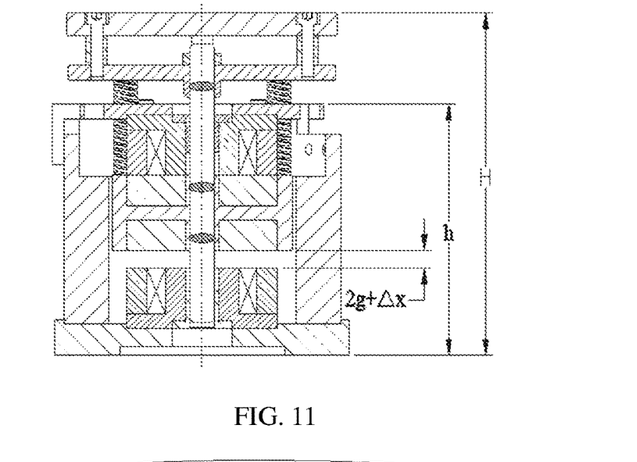
FIG. 11 is a schematic cross-sectional view of the vibration isolator in the state of being not loaded taken along the line A-A.

When the vibration isolator is not loaded, the upper coil 18 and the lower coil 24 both are not energized, the springs 4 are not compressed, and the stator mounting plate 1 is located on first stages of the stepped grooves of the vibration isolator casing 2, and a height from the load plate 5 to the base 3 is H, a height from the stator mounting plate 1 to the base 3 is h, an air gap between the mover assembly and the upper stator assembly is 0, and an air gap between the mover assembly and the lower stator assembly is $2g+\Delta x$.

Figure 12:
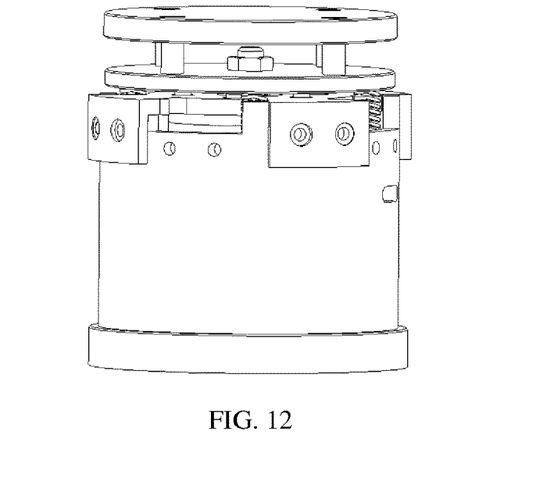
FIG. 12 is a schematic view of the vibration isolator in a state of only being subjected to static load.
Figure 13:
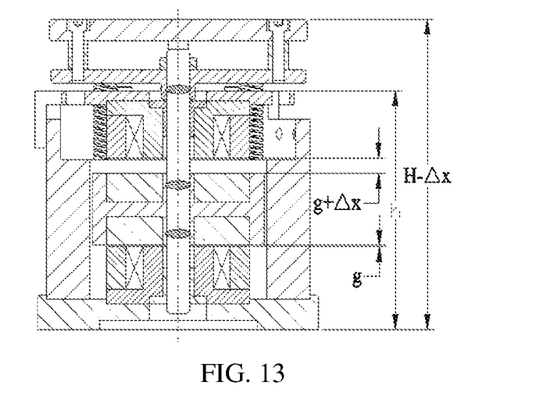
FIG. 13 is a schematic cross-sectional view of the vibration isolator in the state of only being subjected to static load taken along the line A-A.

When the vibration isolator is applied with a static load, the upper coil 18 and the lower coil 24 both are not energized, a compressed amount of the springs 4 is $\Delta x$, the stator mounting plate 1 is located on the first stages of the stepped grooves of the vibration isolator casing 2, the height from the load plate 5 to the base 3 is $H-\Delta dc$, the height from the stator mounting plate 1 to the base 3 is h, the air gap between the mover assembly and the upper stator assembly is $g+\Delta x$, and the air gap between the mover assembly and the lower stator assembly is g. Before the vibration isolator is applied with a dynamic load, the upper coil 18 and the lower coil 24 both are not energized, the stator mounting plate 1 is rotated with a certain angle and thus is moved downwards with a distance $\Delta x$ and placed on second stages of the stepped grooves of the vibration isolator casing 2, the stator mounting plate 1 is positioned at a specific position on the vibration isolator casing 2 through the stator mounting plate positioning pins 31 and is tightened through the stator mounting plate fixing screws 30, the height from the load plate 5 to the base 3 is $H-\Delta x$, the height from the stator mounting plate 1 to the base 3 is $h-\Delta x$, the air gap (i.e., upper air gap) between the mover assembly and the upper stator assembly is g, the air gap (i.e., lower air gap) between the mover assembly and the lower stator assembly is g, the position of the mover assembly can be fine-tuned through the adjustment nut 6 to ensure the upper and lower air gaps to be consistent. In another embodiment, on the basis of the above, it is also possible to make the first stages of the stepped grooves, the second stages of the stepped grooves and the vibration isolator casing 2 not be an integrally formed structure (one-piece structure), so that the first stages of the stepped groove and the second stages of the stepped grooves can move in the vertical direction of the vibration isolator casing 2. In addition, by adding relevant stepped groove height adjustment mechanisms (such as screw rods and screw nuts), heights of the first stages of the stepped grooves and the second stages of the stepped grooves can be adjusted to adapt to different static loads.

Figure 14:
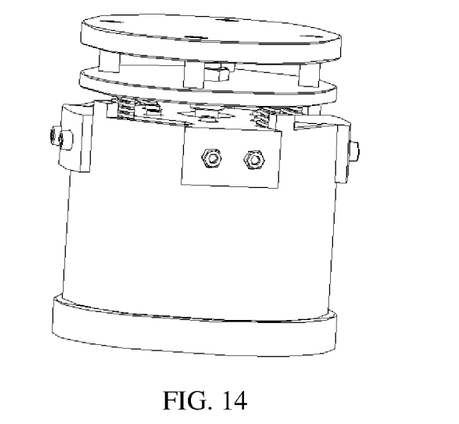
FIG. 14 is a schematic view of the vibration isolator in a state of being subjected to dynamic load.
Figure 15:
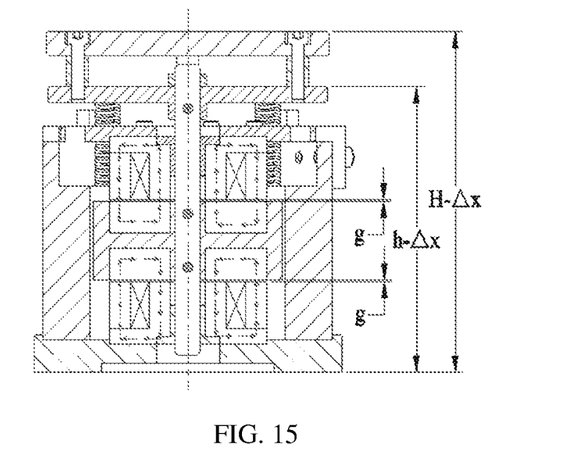
FIG. 15 is a schematic cross-sectional view of the vibration isolator in the state of being subjected to dynamic load taken along the line A-A.

When the vibration isolator is applied with a dynamic load, the upper coil 18 and the lower coil 24 are applied with same direct currents. When the vibration isolator is in the static equilibrium position, the upper and lower air gaps are equal, and an electromagnetic attraction force of the upper stator assembly to the mover assembly is equal to an electromagnetic attraction force of the lower stator assembly to the mover assembly. When the load tends to move upwards, the upper air gap is smaller than the lower air gap, and the electromagnetic attraction force of the upper stator assembly to the mover assembly is greater than the electromagnetic attraction force of the lower stator assembly to the mover assembly, so that the mover assembly is subjected to an upward resultant force and the upward movement tends to be accelerated, showing the characteristic of negative stiffness. When the load tends to move downwards, the lower air gap is smaller than the upper air gap, the electromagnetic attraction force of the lower stator assembly to the mover assembly is greater than the electromagnetic attraction force of the upper stator assembly to the mover assembly, so that the mover assembly is subjected to a downward resultant force and the downward movement tends to be accelerated, showing the characteristic of negative stiffness. As a result, the negative stiffness mechanism composed of the upper stator assembly, the lower stator assembly and the mover assembly is connected in parallel with the positive stiffness springs to achieve a quasi-zero stiffness.

The invention relates to the field of vibration controls, in particular to a quasi-zero stiffness electromagnetic vibration isolator suitable for ultra-low frequency vibration reduction and isolation. Quasi-zero stiffness vibration isolators are mostly composed of positive and negative stiffness mechanisms in parallel, positive stiffness elements (such as springs, etc.) provide static support capacity, and the negative stiffness provided by the negative stiffness mechanism offsets the positive stiffness to achieve quasi-zero stiffness. More specifically, the quasi-zero-stiffness electromagnetic vibration isolator suitable for ultra-low frequency vibration reduction and isolation according to an embodiment of the invention includes: the housing composed of the stator mounting plate, the vibration isolator casing and the base; and the mover assembly, the upper stator assembly, the lower stator assembly, etc. disposed inside the housing. When the vibration isolator is in the static equilibrium position, the upper and lower air gaps are equal, and the electromagnetic attraction force of the upper stator assembly to the mover assembly is equal to the electromagnetic attraction force of the lower stator assembly to the mover assembly. When the load tends to move upward, the upper air gap is smaller than the lower air gap, the resultant force on the mover assembly is upward and the upward movement is accelerated, showing the characteristic of negative stiffness; and the negative stiffness mechanism composed of the upper stator assembly, the lower stator assembly and the mover assembly is connected in parallel with the positive stiffness springs to achieve quasi-zero stiffness. When the load tends to move downwards, the lower air gap is smaller than the upper air gap, the resultant force on the mover assembly is downward and the downward movement is accelerated, showing the characteristic of negative stiffness; and the negative stiffness mechanism composed of the upper stator assembly, the lower stator assembly and the mover assembly is connected in parallel with the positive stiffness springs to achieve quasi-zero stiffness.

The above description is only preferred embodiments of a quasi-zero stiffness electromagnetic vibration isolator suitable for ultra-low frequency vibration reduction and isolation. The protection scope of the quasi-zero stiffness electromagnetic vibration isolator suitable for ultra-low frequency vibration reduction and isolation is not limited to the foregoing embodiments, and all technical solutions under this idea belong to the protection scope of the invention. It should be noted that for those skilled in the art, several modifications and changes made without departing from the principle of the invention should also be regarded as the protection scope of the invention.

What is claimed is:

1. An electromagnetic vibration isolator of quasi-zero stiffness suitable for ultra-low frequency vibration reduction and isolation, the electromagnetic vibration isolator comprising: a stator mounting plate, a vibration isolator casing, a mover assembly, an upper stator assembly, a spring, a lower stator assembly, and a base;

wherein the lower stator assembly is mounted on the base, the vibration isolator casing is mounted on the base, the stator mounting plate is mounted on the vibration isolator casing, the upper stator assembly is mounted on the stator mounting plate, the spring is mounted between the mover assembly and the vibration isolator casing, and the mover assembly is placed on the spring;

wherein the electromagnetic vibration isolator further comprises casing fixing screws, the base is disposed with unthreaded holes, the vibration isolator casing is disposed with threaded holes at corresponding positions, and the vibration isolator casing is mounted to the base through the casing fixing screws; the vibration isolator casing is disposed with stepped grooves, and a position of the stator mounting plate is adjustable through the stepped grooves of the vibration isolator casing to realize a position of the upper stator assembly being adjustable.

2. The electromagnetic vibration isolator as claimed in claim 1, wherein the mover assembly comprises a load plate, an adjustment nut, an intermediate plate, magnetic isolation ring fixing pins, an intermediate plate fixing pin, load plate fixing screws, support sleeves, armature fixing screws, a main shaft, an upper armature, a magnetic isolation ring, and a lower armature;

wherein an inner side of the magnetic isolation ring and the main shaft each are disposed with two pin holes at corresponding positions, and the magnetic isolation ring fixing pins fix the magnetic isolation ring and the main shaft together; the upper armature and the lower armature are symmetrically mounted into upper and lower sides of the magnetic isolation ring respectively, and the armature fixing screws fix the upper armature and the lower armature with the magnetic isolation ring together; corresponding positions of the intermediate plate and the main shaft respectively are disposed with pin holes, and the intermediate plate fixing pin fixes the intermediate plate and the main shaft together;

wherein part of the main shaft above the intermediate plate is threaded to fit with the adjustment nut, the adjustment nut is mounted on the main shaft, the intermediate plate is disposed with threaded holes, and the load plate is disposed with unthreaded holes, the load plate is mounted above the intermediate plate through the support sleeves and the load plate fixing screws, and the support sleeves are located between the intermediate plate and the load plate.

3. The electromagnetic vibration isolator as claimed in claim 1, wherein the upper stator assembly comprises: an upper inner iron core, an upper coil, an upper outer iron core, an upper oil-free shaft sleeve, upper shaft sleeve fixing screws, and upper iron core fixing screws;

wherein the upper coil is wound around the upper inner iron core, and the upper outer iron core is mounted to an outer side of the upper inner iron core; the upper inner iron core and the stator mounting plate are disposed with unthreaded holes, the upper outer iron core is correspondingly disposed with threaded holes, and the upper iron core fixing screws fix the upper inner iron core and the upper outer iron core to the stator mounting plate; and the upper oil-free shaft sleeve is mounted to an inner side of the upper inner iron core through the upper shaft sleeve fixing screws.

4. The electromagnetic vibration isolator as claimed in claim 1, wherein the lower stator assembly comprises: a lower inner iron core, a lower coil, a lower outer iron core, a lower oil-free shaft sleeve, lower shaft sleeve fixing screws, and lower iron core fixing screws;

wherein the lower oil-free shaft sleeve is mounted to an inner side of the lower inner iron core through the lower shaft sleeve fixing screws, and the lower outer iron core is mounted to an outer side of the lower inner iron core; the lower inner iron core and the base are disposed with unthreaded holes, and the lower outer iron core is disposed with threaded holes at corresponding positions, and the lower iron core fixing screws fix the lower inner iron core and the lower outer iron core to the base; and the lower coil is wound around the lower inner iron core.

5. The electromagnetic vibration isolator as claimed in claim 1, wherein the stator mounting plate is mounted on the stepped grooves of the vibration isolator casing, the stator mounting plate and the vibration isolator casing are disposed with pin holes at corresponding positions, the stator mounting plate is disposed with unthreaded holes, and the vibration isolator casing is disposed with threaded holes at corresponding positions, the stator mounting plate is mounted to the vibration isolator casing through stator mounting plate positioning pins and fixed through stator mounting plate fixing screws.

6. The electromagnetic vibration isolator as claimed in claim 2, wherein the vibration isolator casing is provided with an observation hole, and the observation hole is configured to be cooperative with the adjustment nut of adjusting centricity of the mover assembly in a case of the vibration isolator is in a static equilibrium position and thereby ensuring air gaps between the upper stator assembly as well as the lower stator assembly and the mover assembly to be consistent.

* * * * *